United States Patent [19]

Feldman et al.

[11] Patent Number: 4,708,225
[45] Date of Patent: Nov. 24, 1987

[54] OVERLOAD PROTECTION AND/OR WARNING ARRANGEMENT

[75] Inventors: Joachim Feldman, Neustadt; Manfred Schult, Garbsen, both of Fed. Rep. of Germany

[73] Assignee: WABCO Westinghouse Fahrzeugbremsen GmbH, Hanover, Fed. Rep. of Germany

[21] Appl. No.: 823,717

[22] Filed: Jan. 29, 1986

[30] Foreign Application Priority Data

Jan. 29, 1985 [DE] Fed. Rep. of Germany ....... 3502825

[51] Int. Cl.⁴ ............................................ B60T 17/22
[52] U.S. Cl. ............................ 188/1.11; 303/DIG. 4; 340/52 C
[58] Field of Search .............. 188/1.11, 181 A, 181 T; 303/1, 92, 112, DIG. 1-4; 340/52 C

[56] References Cited

U.S. PATENT DOCUMENTS 3,235,036 2/1966 Meyer et al. ..................... 188/181 C
3,402,972 9/1968 Cooper et al. ............ 303/DIG. 3 X
3,433,536 3/1969 Skinner ....................... 188/181 C X
4,361,825 11/1982 Shockley ................. 303/DIG. 3 X
4,545,240 10/1983 Leiber ...................... 303/DIG. 4 X

FOREIGN PATENT DOCUMENTS 0230856 12/1984 Japan ........................... 303/DIG. 3

Primary Examiner—Duane A. Reger
Attorney, Agent, or Firm—J. B. Sotak

[57] ABSTRACT

An overload protection and/or warning arragement for a vehicle brake which is activated by brake pressure so that overload protection and warning indication occurs essentially without any time-delay.

In one embodiment of the invention, it is proposed to compare, by means of a comparison apparatus, a design brake pressure P(design) determined on the basis of a regulated variable imparted to an activation apparatus of the vehicle brake and of operating data of the vehicle and/or of the design data of the brakes and of the brake application apparatus with the actual brake pressure P(actual), and to initiate a warning signal if P(actual) differs by a specified amount from P(design).

In another embodiment of the invention, it is proposed that the warning signal be initiated if the actual brake pressure produced by the existing brake pressure differs by a specified amount from a design brake force which is determined from the brake pressure and the design data of the brake and the brake-actuating apparatus.

8 Claims, 2 Drawing Figures

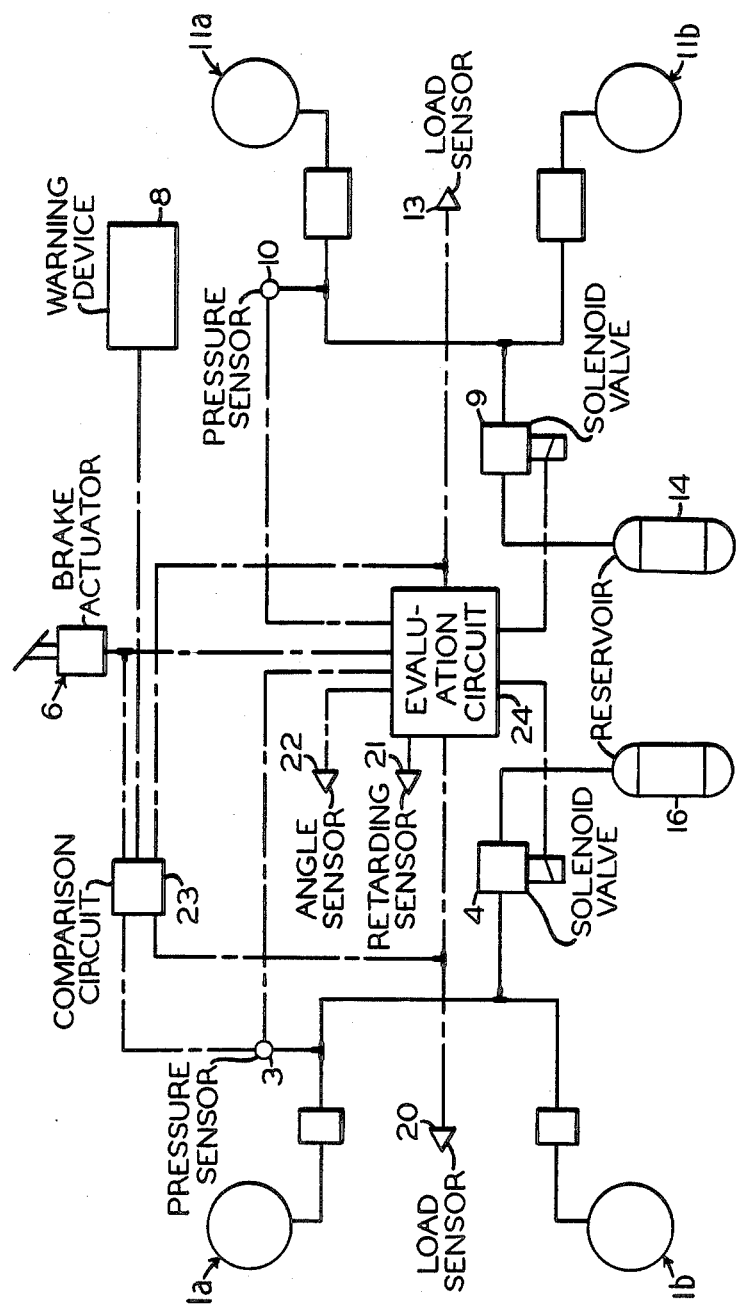

OVERLOAD PROTECTION AND/OR WARNING ARRANGEMENT

FIELD OF THE INVENTION

The present invention relates to an overload protection and/or warning arrangement for a vehicle braking system, which is activated by the brake pressure so that an alarm is initiated without undue time-delay.

BACKGROUND OF THE INVENTION

There are a number of different types of braking systems, one of which is shown and disclosed in International patent application No. WO 84/00406. In these previous braking systems, the temperature in the vicinity of the brake drum or of the brake disc was used as a yardstick for determining the load on the brake, by means of temperature sensors located on fixed brake components. By means of a temperature-comparison apparatus, a warning circuit is closed so that an optical and acoustical warning indication is initiated when an unusually high temperature occurs.

A disadvantage of the prior art is the time-delay involved in measuring and monitoring the temperature. It can be assumed that the unusually high temperature, and thus the load on the brakes, will have a damaging effect before the warning indication is initiated, on account of the above-mentioned time-delay.

OBJECTS AND SUMMARY OF THE INVENTION

An object of the present invention is, therefore, to provide an improved overload protection and/or warning arrangement, so that the warning indication or overload protection can be triggered without an undue time-delay.

Another object of the present invention is to provide an overload protection and/or warning arrangement for a vehicle brake, which is activated by brake pressure, so that an overload protection and warning indication occurs essentially without any time-delay.

If the vehicle, and the vehicle brake including the brake-actuating apparatus and the manipulated mechanism, are considered the controlled system, then the brake pressure need not be the regulating variable. For example, a command value, which is a function of the adhesion between the wheel and the roadway, could be used as a regulating variable.

The present invention can be advantageously utilized with any desired regulating variable, for example, with the brake pressure as the regulating variable. The case in which the brake pressure represents the regulating variable, is one in which the level of the brake pressure is controlled (in a known manner) by means of a brake pressure control valve as a function of the force exerted on it by a pedal or lever, or as a function of the angle or distance during the activation of the pedal or lever.

In a preferred embodiment, the invention can be utilized if the activation apparatus is an electrical regulating apparatus for the brake force, or the braking torque for retarding the vehicle. In this case, a command value for the brake force or the braking torque or the retarding of the vehicle is specified by means of a braking value transmitter or sender. The level of the command value is a function of the activation force, which is exerted on a manipulated element of the command value transmitter, or of the distance or the angle by which the control element is manipulated. By means of an electronic regulating system, when the braking value transmitter is activated, an electrically-controlled valve is opened until a brake pressure has built up in the brake-actuating apparatus, at which the brake force or the braking torque or the vehicle-retarding (monitored by the electronic regulating system) corresponds to the command value. If deviations occur after the command value has been reached, the valve is modulated by the electronic regulating system depending on the type of deviation in the sense of the continued feed of brake pressure or a reduction of the brake pressure. In this case, therefore, the actuating force exerted on the manipulated element of the braking value transmitter or the distance or angle by which the control element is manipulated, represents the control variable, the brake pressure, the correcting variable, and the brake force or the braking torque or the vehicle retarding the regulating variable for the electronic regulating system.

The invention can be utilized for an individual vehicle brake, but it can also be employed for a brake system having individual vehicle brakes, whereby the activation apparatus can either be designed to control all the vehicle brakes in common or each individual vehicle brake separately, or combined groups of individual vehicle brakes. The comparison apparatus can also be employed in a brake system consisting of individual vehicle brakes, for each vehicle brake separately, for groups of vehicle brakes, or for all the vehicle brakes.

It is also possible to assign other functions to the activation apparatus of the vehicle brake or, in the case of a brake installation, to individual vehicle brakes or groups of vehicle brakes, for example, a load-controlled braking action (ALB) or an anti-locking brake system (ABS).

If, on a known vehicle brake with an activation apparatus designed as an electronic regulating system (specifically of the type described above in greater detail), there is a drop in the regulating variable as a result of temperature-fading (specifically a drop in the brake force or the braking torque), and if a decrease in the vehicle-retarding occurs, then, as described above, the electronic regulating system, by reapplying the brake pressure, continues adjusting the regulating variables to the command value, without the driver noticing the occurence of the temperature-fading. Since temperature-fading is always a sign of maximum loading or overloading of the vehicle brake on account of a high absorption of energy, the driver, if he is unaware of the critical condition of the vehicle brake, runs the risk of continuing to apply the brake until it is damaged to the point where it becomes unusable. The invention is, therefore, able to warn the driver of the dangerous condition of the vehicle brake. For this purpose, the warning signal, produced by the comparison apparatus, is to be conducted to a warning device which has an optical or acoustical warning indicator.

It is also envisioned to control (by means of the warning signal) a brake-release apparatus, which operates the valve located in the brake pressure feed line to the brake-actuating apparatus when it receives the warning signal, in the sense of a reduction of the brake pressure or the prevention of any further feed of brake pressure, and therefore acts as an automatic overload protection for the vehicle brakes. The intervention of the brake-release apparatus is experienced by the driver as a loss of braking action. As on a known and altogether ordinary brake system with brake pressure control, the driver is given a feeling for the temperature-fading of the vehicle brake by the loss of braking action. It is apparent that these remarks, concerning a vehicle brake, also apply correspondingly for a brake system or its individual vehicle brakes.

BRIEF DESCRIPTION OF THE DRAWINGS

The above objects and other attendant features and advantages of the subject invention will become more readily apparent, from the following detailed description, when taken in conjunction with the accompanying drawings, wherein:

FIG. 2 is a schematic block diagram of another embodiment of a brake system, in which the vehicle-retarding forms the regulating variable.

DETAILED DESCRIPTION OF THE INVENTION

Figure 1:
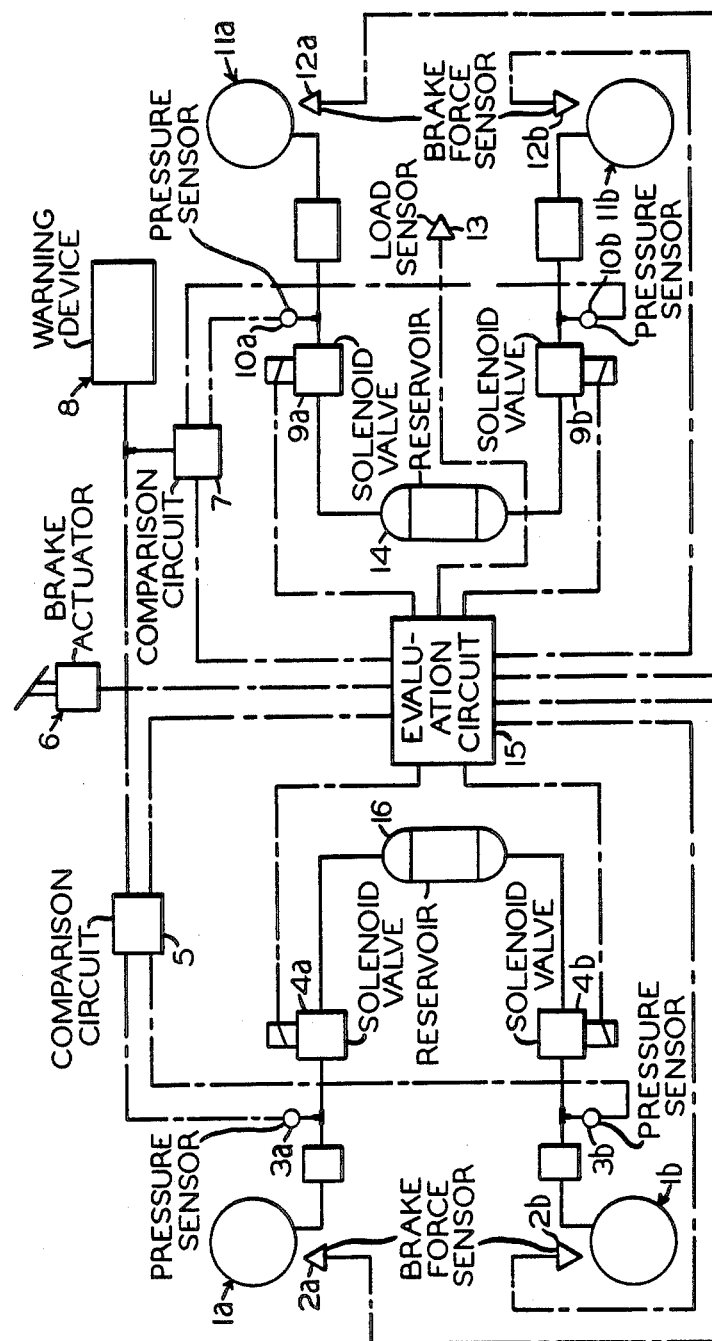
FIG. 1 is a schematic block diagram of one embodiment of a braking system, in which the brake force or the braking torque forms the regulating variable.

Referring now to the drawings, it will be noted that the elements or components with the same function are uniformly labeled with the same reference numbers. Furthermore, it will be noted that in both FIGURES the postfix "a" refers to the right side of the vehicle, while the postfix "b" refers to the left side of the vehicle. In addition, solid lines all represent brake presure lines or conduits, while the dot-and-dash lines represent electrical lines or leads.

Referring now to FIG. 1 of the drawings, it will be seen that the front axle, which has each side of the vehicle labeled 1a and 1b, respectively, and each component of the corresponding initiating apparatus. The initiating apparatus of each brake 1a and 1b can be pressurized through its own electrically-controlled valve 4a and 4b with brake pressure from a pressure supply reservoir 16.

The brake system also includes a rear axle which has each side of the vehicle, identified along with their corresponding initiating apparatus, as 11a and 11b, respectively. The brake pressure which exists in the initiating apparatus is measured by a brake pressure sensor 3a, 3b, 10a or 10b for each brake member 1a, 1b, 11a or 11b, respectively. The pressure sensors supply electrical output signals, which are a function of the existing brake pressures, called "the actual brake pressure signal". Each of the members 1a, 1b, 11a and 11b also has a brake force sensor 2a, 2b, 12a and 12b, respectively. The force sensors measure the brake force produced by the corresponding vehicle brake, and deliver output signals as a function of the level of the brake force as actual brake pressure signals. The actual brake pressure signals, as will be apparent to one skilled in the art, can also be evaluated as actual braking torque signals.

The rear axle also has a load sensor 13, which measures the rear-axle load and produces load signals as a function thereof.

It will be seen that there is electrical regulating equipment. The regulating or control quantity is dependent upon the brake force of the initiating apparatus for each of the vehicle brakes 1a, 1b, 11a and 11b, and therefore for the brake system. This regulating or control equipment consists of a braking valve actuated by sender or transmitter 6, and an evaluation apparatus 15 which, together with the brake force sensors 2a, 2b, 12a, 12b and the load sensor 13, form an electronic regulating system.

As shown in FIG. 1, a comparison apparatus 5 is provided for the front axle, and a comparison apparatus 7 is provided for the rear axle. It is apparent that these comparison apparatus can be combined with one another, either in whole or in part, and also with the evaluation apparatus 15 of the electronic regulating system. That is, each of the comparison apparatus 5 and 7 is electrically-connected with the evaluation apparatus 15. In addition, the comparison apparatus 5 is electrically-connected to the brake pressure sensors 3a, 3b of the front axle, and the comparison apparatus 7 is electrically-connected to the brake pressure sensors 10a, 10b of the rear axle.

It will be seen that a warning device 8 is connected with outputs of the comparison apparatus 5 and 7.

The brake valve actuator or transmitter 6 includes a manipulating element, such as, a brake pedal. The desired braking force is activated by operating the manipulating element. During operation, the transmitter 6 produces a signal which is a function of the angle or the distance travelled by the manipulating element, or of the force applied to the manipulating element which is called "the s-signal, or simply 's'".

The operation of the brake system will first be explained on the basis of vehicle brake 1a and its corresponding elements. The evaluation apparatus 15 computes a brake pressure command value signal from the s-signal which is fed to it. The evaluation apparatus 15 compares the actual brake force signal produced by the brake force sensor 2a, with the brake force command value signal, and moves the valve 4a into the open position until a brake pressure P(actual) from the brake pressure reservoir 16 flows into the initiating apparatus of the vehicle brake 1a, at which the actual brake force signal produced by the brake force of the vehicle brake 1a corresponds with a specified precision to the command value brake force signal. If, after the closing of the valve 4a, a change occurs in the brake force and therefore a variation occurs from the actual brake force signal, the evaluation apparatus 15 modulates the valve 4a as a function of the deviation in the sense of a reduction or an increase of actual brake pressure P(actual) until correspondence between the command value signal and the actual braking power signal is reestablished.

At the same time, the evaluation apparatus 15 computes, from the command value brake force signal, a designed brake pressure signal which indicates a design brake pressure to be determined according to the following general formula:

$$P(design) = B(command)/A \tag{I}$$

where:
A—is one of the constants characterizing the design data of the vehicle brake and initiating apparatus (internal characteristic, contact surface of the initiating apparatus, translation ratio, and efficieny), and B(command)—is the command braking power signal specified by the evaluation apparatus 15.

The comparison apparatus 5 compares the actual brake pressure signal for P(actual) with the design brake pressure signal P(design). If the actual brake pressure signal is higher than the design brake pressure signal P(actual) >P(design) by a predetermined amount, the comparison apparatus 5 causes a warning signal (which activates the warning apparatus 8) to produce an optical or acoustical signal. The warning apparatus 8, however, can also be designed as a brake-release device, so that when it receives the warning signal (in the manner described above), it intervenes in the control of the valve 4a. For this purpose, the warning apparatus 8 can be connected directly with the evaluation apparatus 15 in a manner not shown.

In accordance with the preceding description, the s-signal is the control variable, the brake force is the regulating variable, and the actual brake pressure is the manipulated variable for the regulating equipment.

The electronic regulating system operates in the same manner as explained above for the vehicle brake 1a, in connection with the brake pressure sensor and the comparison devices 5 and 7 for the other vehicle brakes 1b, 11a, 11b. When the command value brake force signal and the design brake pressure signal for the vehicle brakes 11a, 11b of the rear axle circuit are calculated, the evaluation apparatus 15 takes into consideration, the load status of the rear axle. A factor $i_{ALB}$ is taken into consideration in the calculation of the above-mentioned command values for the wheel brakes 11a, 11b of the rear axle, so that the evaluation apparatus 15 also takes over the function of a load-controlled brake pressure regulator (ALB). Moreover, the load signal of the load sensor 13 may be taken in consideration with the control of the front axle with the wheel brakes 1a, 1b in a known manner.

Taking the above into consideration, the general formula (I) for the design brake pressure for the front axle is to be modified to:

$$P_V(\text{design}) = B(\text{command})V/A_V \quad (II)$$

$$P_H(\text{design}) = B(\text{command})H/A_H \quad (III)$$

where the postfix "V" refers to the front axle and the postfix "H" refers to the rear axle. In the determination of B(command)V and B(command)H, the evaluation apparatus 15 takes into consideration the load signal of the load sensor 13.

In a manner not explained in further detail, the vehicle brakes of the front axle and/or the vehicle brakes of the rear axle can also be electrically-connected, via a joint electrically-controlled valve, with the corresponding brake pressure reservoir; in which case, the processes described above are performed on the axles. In addition to decreasing the number of electrically-controlled valves, this solution has the advantage of a simplified evaluation apparatus and comparison apparatus, as well as fewer brake pressure and brake force sensors.

The warning device 8 can be designed so that it will indicate which of the vehicle brake or brakes' comparison apparatus had tripped it.

For the brake system illustrated in FIG. 2, the regulating variable is proportional to the vehicle retardation, so that the remarks made in relation to FIG. 1 will apply, with exception to the remarks below.

In the following description, "vehicle retardation" will always mean the retarding that takes place in the direction parallel to the surface of the roadway.

It will be appreciated that element 21 is a retarding sensor, which produces a retarding signal in accordance with the amount of retardation of the vehicle. This retarding signal can be readily derived, for example, by means of a wheel retarding sensor.

Since, with this latter-type of activation equipment, it is not readily possible to split the regulating variable to the individual wheel brakes, there is provided a common electrically-controlled valve 4 or 9 and a common brake pressure sensor 3 or 10 for the vehicle brakes of the front and rear axles, respectively.

Since, with this latter-type of activation equipment, there is a vehicle-retarding command value corresponding to a given s-signal, the determination of P(design) is only possible if the weight of the vehicle and the slope of the roadway are taken into consideration. Therefore, this equipment includes an angle sensor 22 for the slope of the roadway α. In addition to the rear axle load sensor 13, a load sensor 20 is employed for the front axle.

It will be seen from a following equation (IV), the design brake pressure signal need only be formulated for the vehicle brakes of one axle, and, therefore, only one comparison apparatus (23) is required. Since the design brake pressure signal forms the basis for both the vehicle brakes 1a, 1b of the front axle, the comparison apparatus 23 is electrically-connected only to the brake pressure sender 3 of the front axle. As shown, the comparison apparatus 23 is also connected with the load sensors 13, 20, in addition to the braking power sender or brake actuator 6 and the warning device 8.

The evaluation apparatus 24 is electrically-connected with the load sensor 20, the retarding sensor 21, the angle sensor 22, and the brake pressure sensors 3, 10 in addition to the braking power sender 6, the valves 4, 9, as well as the load sensor 13.

The evaluation apparatus 24, along with the sensors assigned to it, again form the electronic regulating system which can be combined physically or electrically, either completely or in part, with the comparison apparatus 23.

When the braking power sender 6 is operated, the evaluation apparatus 24, on the basis of the s-signal fed to it, forms a command value vehicle-retarding signal. The evaluation apparatus 24 compares the actual retarding signal supplied by the retarding sensor 21, with this command value vehicle-retarding signal. The evaluation apparatus 24 thereby modulates the solenoid valves 4, 9 in the open position until the above-mentioned retarding signals are within a specified value. The evaluation apparatus 24, therefore, maintains a ratio of rear axle brake pressure to front axle brake pressure, which is a function of the factor $i_{ALB}$. Therefore, it acts simultaneously as a load-controlled braking system. For this purpose, the brake pressure sensors 3, 10 are electrically-connected to the evaluation apparatus 24. The factor $i_{ALB}$ can thus be computed on the basis of the load signals of the load sensor 13 in the comparison apparatus 23 and/or in the evaluation apparatus 24.

At the same time, the comparison apparatus 23 and/or the evaluation apparatus 24 form a vehicle weight signal which is a function of the load signals of the load sensors 13, 20, and which is used by the comparison apparatus 23 and is based on the relationship that:

$$P_{V(\text{design})} = \frac{m \cdot g \ (B(s) + \sin \alpha)}{2 \ (A_V + A_H \cdot i_{ALB})} \quad (IV)$$

which forms a design brake pressure signal for the front axle, wherein:

g is gravity;

B(s) is a conversion of "s" formed in the evaluation apparatus 24 into the vehicle-retarding command value, indicated in percent (%) in relation to g; is the slope of the roadway;

m is the mass of the vehicle;

V is the index for the front axle; and
H is the index for the rear axle.

The vehicle mass m, as described above, is determined from the axle load signals from the front axle load sensor 20 and the rear axle load sensor 13. However, there are certain vehicles which, on account of their construction and specific type of loading, for example, liquid transports, and dumptrucks which transport bulk goods, only permit acceptable determination of the weight with one axle load sensor. On these vehicles, the load on the front axle is sufficiently proportional to the load on the rear axle, so that a rear-axle load signal is sufficiently precise to the total weight of the vehicle. This is correspondingly true, even in the case where the load-sensing is accomplished only on the front axle. Such an arrangement has the advantage of eliminating one of the load sensors 13 or 20 and of simplifying the evaluation apparatus 24.

In the embodiment illustrated in FIG. 2, therefore, the s-signal is the control variable, the vehicle-retarding is the regulating variable, and the actual brake pressure is the manipulated variable for the electronic regulating system.

The comparison apparatus or circuits mentioned in the embodiments can be designed so that a deviation of P(actual) from P(design) is measured in the form of a load factor;

$$F = P(\text{actual})/P(\text{design})$$

In this case, the warning signal can be triggered if the load factor F reaches a limit value, for example, when F=1.2.

On the basis of the above-mentioned equations (I) to (V) and of the fact that with a brake overload there is a change of the constant A, which may be defined as A', primarily on account of a change of the internal characteristic of the overloaded vehicle brake, F, in the case of the embodiment illustrated in FIG. 1, can be written:

$$F = \frac{B(s)}{A'} \cdot \frac{A}{B(s)} = \frac{A}{A'} \quad (V)$$

and in the case of the embodiment illustrated in FIG. 2:

$$F = \frac{A_V + A_H \cdot 1_{ALB}}{A'_V + A'_H \cdot 1_{ALB}} \quad (VI)$$

In the latter case, it may also occur that only $A_V$ or $A_H$ have changed to a value $A'_V$ or $A'_H$.

The above-described embodiments of FIGS. 1 and 2 can be converted by simple means into another embodiment of the invention, which compares the actual brake force produced by means of the current brake pressure with a design brake force determined by this brake pressure and by the design data of the brake and of the initiating apparatus, which causes the warning signal to be produced if the actual brake force deviates, by a specified value, from the design brake force. In a manner which will be apparent to one skilled in the art, instead of the above-mentioned brake forces, the corresponding braking torques can also be taken into consideration. The above-mentioned design data of the brakes and the initiating apparatus are thereby represented by the constant A as described above.

To achieve the above-mentioned alternate embodiment of the invention, in the case of the embodiment illustrated in FIG. 1, only the following measures are necessary, which will first be described using the example of vehicle brake 1a and the corresponding apparatus:

First, the actual brake pressure signal of the brake pressure sensor 3a is fed to the evaluation apparatus 15 instead of to the comparison apparatus 5.

Second, the evaluation apparatus 15 is designed so that it computes and feeds to the comparison apparatus 5, a design brake force signal from the actual braking signal, using the equations (I) and (II) instead of the design brake pressure signal.

Third, the actual brake force signal of the brake force sensor 2a is used and is fed both to the evaluation apparatus 15 and to the comparison apparatus 5, which, in this case, does not require the actual braking pressure signal.

Fourth, the comparison apparatus 5 is designed so that it compares, instead of the above-mentioned brake pressure signals, the actual braking force signal with the command value brake pressure signal, and when the two values differ by a specified amount, controls the warning apparatus 8 in the manner described above.

As a result of the measures described above, there is no intervention in the evaluation apparatus itself; the control variable, regulating variables, and manipulated variables remain unaffected.

The embodiment illustrated in FIG. 1, modified as described above into the alternate embodiment of the invention, can be again converted into yet another configuration by simple means, by using the brake pressure instead of the brake force as the regulating variable. For this purpose, the evaluation apparatus 15 must be designed so that it forms a command value brake pressure signal from the s-signal and, on the basis of the actual brake pressure signal of the brake pressure sensor 3a, regulates the actual brake pressure by controlling the valve 4a as a function of the command value brake pressure. The actual brake force signal of the brake force sensor 2a, in this case, need not be fed to the evaluation apparatus 15, but only to the comparison apparatus 5.

In the last-named configuration of the alternate embodiment of the invention, finally, the braking value transmitter 6, which is in communication with the valve 4a and with the evaluation apparatus 15, can be replaced by a brake valve which is constructed according to the prior art and which is therefore not described here in any further detail which, during operation, releases brake pressure to the vehicle brake 1a from a reservoir. In this case, the brake pressure sensor 3a could also be omitted, and the comparison apparatus 5, instead of from its actual brake pressure signal, could form the design brake pressure signal directly from the command variable of the brake valve, namely, the activation force, distance, or angle.

It will be apparent to a specialist in the field that the remarks made above for the vehicle brake 1a are also applicable for other vehicle brakes of the brake system illustrated in FIG. 1.

All the other remarks made above, in relation to the embodiment illustrated in FIG. 1, apply accordingly for the configurations of the other embodiment of the invention.

If the embodiment, illustrated in FIG. 2, is to be converted to the above-mentioned alternate embodiment of the invention, then for this purpose, there must be a brake force sensor on at least one wheel brake of each brake circuit, the actual brake force signal from which is fed to the comparison apparatus 23 or to another comparison apparatus. The measures which are also necessary with regard to the configuration of the evaluation apparatus 24, the comparison apparatus 23, the other comparison apparatus and their connections with the braking pressure and brake force sensors, can be understood by the appropriate application of the remarks made in relation to the embodiment illustrated in FIG. 1.

In the case of the other embodiment of the invention, too, to measure the difference between the design brake force and the actual braking force, a load factor can be formed which, as the following remarks show, is identical with F defined above. We use $$F = \text{Design brake power} / \text{Actual brake power} \quad \text{(VII)}$$

This expression can be written, with the corresponding use of the equations (I) to (IV), and after their conversion, as:

$$F = \frac{P(\text{actual}) \cdot A}{P(\text{actual}) \cdot A'} = \frac{A}{A'}$$

for the case of the converted embodiment, illustrated in FIG. 1, and as:

$$F = \frac{P(\text{actual}) \cdot 2(A_V + A_H \cdot i_{ALB})}{P(\text{actual}) \cdot 2(A'_V + A'_H \cdot i_{ALB})} = \frac{A_V + A_H \cdot i_{ALB}}{A'_V + A'_H \cdot i_{ALB}}$$

for the case of the converted embodiment illustrated in FIG. 2, whereby again, $A_V$ or $A_H$ can have assumed the value $A'_V$ or $A'_H$.

The equation (VII), therefore, leads identically to the equations (V) or (VI).

Otherwise, all the introductory remarks apply correspondingly to the embodiments illustrated in FIGS. 1 and 2.

It is apparent that the above remarks do not exhaustively describe the scope of application of the present invention. Specifically, the braking pressure can be applied by mes of either a pneumatic or a hydraulic pressure medium.

We claim:

1. (a) Overload protection and/or warning arrangement for a vehicle brake;
    (b) the brake is operable by applying brake pressure to an actuator;
    (c) said brake pressure is applied to the actuator by means of an initiating apparatus;
    (d) a comparison apparatus is provided;
    (e) said comparison apparatus compares a design brake pressure P(design) with the actual brake pressure P(actual) applied to the actuator;
    (f) P(design) is determined by any given travel of a manipulating element of said initiating apparatus and by the operational characteristics of the vehicle and by the design characteristics of said brake and said actuator;
    (g) P(actual) is the brake pressure actually applied to the actuator for said given travel of said manipulating element;
    (h) said comparison apparatus produces a warning signal when P(actual) differs by a predetermined amount from P(design).

2. (a) Overload protection and/or warning apparatus for a vehicle brake;
    (b) said brake is operable by applying brake pressure to an actuator;
    (c) a comparison apparatus is provided;
    (d) said comparison apparatus compares an actual brake force with a design brake force;
    (e) said actual brake force is produced by any given brake pressure;
    (f) said design brake force is determined by said given brake pressure and by the design characteristics of said brake and said actuator;
    (g) said comparison apparatus produces a warning signal when said actual brake force differs by a predetermined amount from said design brake force.

3. Overload protection and/or warning arrangement, according to claim 1, wherein said initiating apparatus is designed as an electrical regulating apparatus for the brake force for the vehicle-retarding with which the manipulating element has been moved, in which the brake force for the vehicle-retarding is determined by a regulating variable, and the brake pressure fed to the brake-actuating apparatus is a function of the regulated variable.

4. Overload protection and/or warning apparatus, according to claim 2, wherein a brake valve has an activation force exerted on the brake, which is a function of movement of a manipulated element to control the level of the brake pressure.

5. (a) Overload protection and/or warning arrangement for a vehicle brake;
    (b) the brake is operable by applying brake pressure to an actuator;
    (c) said brake pressure is applied to the actuator by means of an initiating apparatus;
    (d) a comparison apparatus is provided;
    (e) said comparison apparatus compares a design brake pressure P(design) with the actual brake pressure P(actual) applied to the actuator;
    (f) P(design) is determined by any given movement of a manipulating lement of said initiating apparatus and by the operational characteristics of the vehicle and by the design characteristics of said brake and said actuator;
    (g) P(actual) is the brake pressure actually applied to the actuator for said given movement of said manipulating element;
    (h) said comparison apparatus produces a warning signal when P(actual) differs by a predetermined amount from P(design).

6. (a) Overload protection and/or warning arrangement for a vehicle brake;
    (b) the brake is operable by applying brake pressure to an actuator;
    (c) said brake pressure is applied to the actuator by means of an initiating apparatus;
    (d) a comparison apparatus is provided;
    (e) said comparison apparatus compares a design brake pressure P(design) with the actual brake pressure P(actual) applied to the actuator;
    (f) P(design) is determined by any given angular travel of a manipulating element of said initiating apparatus and by the operational characteristics of the vehicle and by the design characteristics of said brake and said actuator;

(g) P(actual) is the brake pressure actually applied to the actuator for said given angular travel of said manipulating element;

(h) said comparison apparatus produces a warning signal when P(actual) differs by a predetermined amount from P(design).

7. (a) Overload protection and/or warning arrangement for a vehicle brake;

(b) the brake is operable by applying brake pressure to an actuator;

(c) said brake pressure is applied to the actuator by means of an initiating apparatus;

(d) a comparison apparatus is provided:

(e) said comparison apparatus compares a design brake pressure P(design) with the actual brake pressure P(actual) applied to the actuator;

(f) P(design) is determined by any given activation force of a manipulating element of said initiating apparatus and by the operational characteristics of the vehicle and by the design characteristics of said brake and said actuator;

(g) P(actual) is the brake pressure actually applied to the actuator for said given activation force of said manipulating element;

(h) said comparison apparatus produces a warning signal when P(actual) differs by a predetermined amount from P(design).

8. (a) Overload protection and/or warning apparatus for a vehicle brake;

(b) said brake is operable by applying brake pressure to an actuator;

(c) a comparison apparatus is provided;

(d) said comparison apparatus compares an actual brake torque with a design brake torque;

(e) said actual brake torque is produced by any given brake pressure;

(f) said design brake torque is determined by said given brake pressure and by the design characteristics of said brake and said actuator;

(g) said comparison apparatus produces a warning signal when said actual brake torque differs by a predetermined amount from said design brake torque.

* * * * *